(No Model.) 2 Sheets—Sheet 1.

O. H. JEWELL.
WATER PURIFIER AND FILTER.

No. 377,389. Patented Feb. 7, 1888.

Fig. 3ª.

Witnesses,
W. Rossiter
Otto Lubkort

Inventor
Omar H. Jewell
By Wm. H. Lotz
Atty.

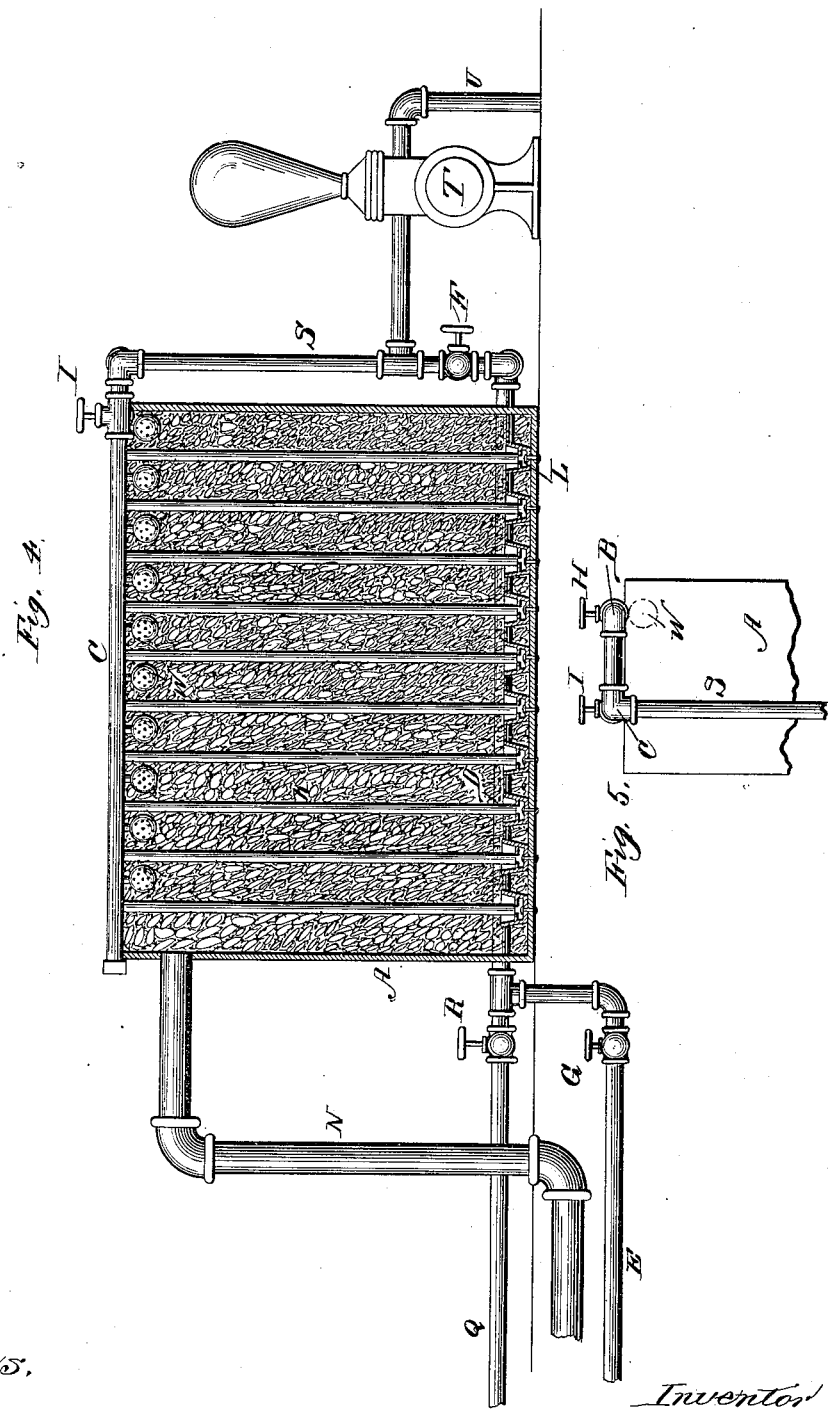

UNITED STATES PATENT OFFICE.

OMAR H. JEWELL, OF CHICAGO, ILLINOIS.

WATER PURIFIER AND FILTER.

SPECIFICATION forming part of Letters Patent No. 377,389, dated February 7, 1888.

Application filed July 19, 1887. Serial No. 244,786. (No model.)

*To all whom it may concern:*

Be it known that I, OMAR H. JEWELL, a citizen of the United States of America, residing at Chicago, in the county of Cook and State of Illinois, have invented certain new and useful Improvements in Water Purifiers and Filters, of which the following is a specification, reference being had therein to the accompanying drawings.

This invention relates to apparatus for filtering and purifying water; and it has for its object to provide such an apparatus particularly intended to be connected with water-works of cities and towns for filtering large quantities, and that can be washed out from time to time without removing the filtering material by reversing the current; and with that object in view my invention consists of the novel devices and combinations of devices hereinafter described and specifically claimed.

Figure 1:
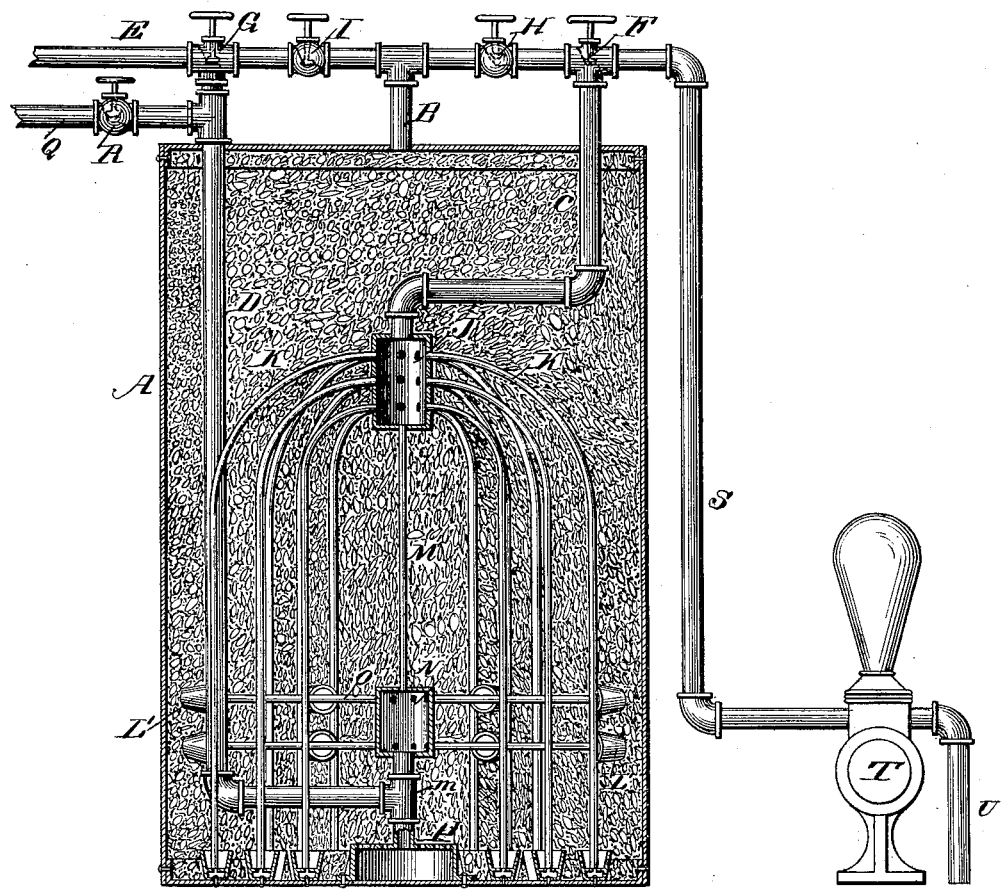
Figure 2:
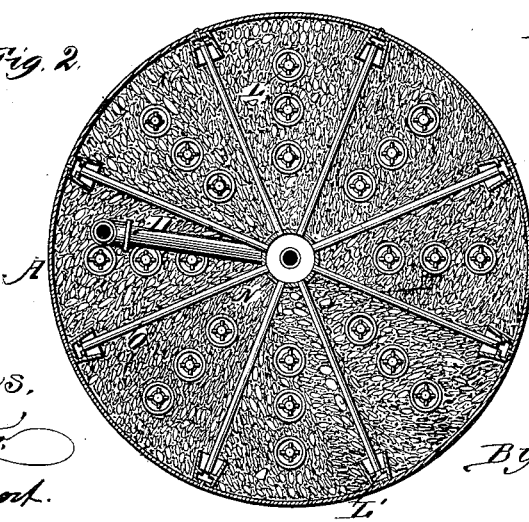
Figure 3:
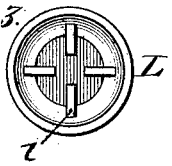

In the accompanying drawings, Figure 1 represents a sectional view, and Fig. 2 a sectional plan, of my apparatus. Fig. 3 is a plan of one of the cup-shaped pipe-holders. Fig. 3ª is a bottom end view of one of the pipes, showing the strainer. Fig. 4 is a sectional elevation, and Fig. 5 a partial end elevation, of the apparatus modified.

Corresponding referential characters in the several figures of the drawings designate like parts.

In Figs. 1 and 2, A denotes the tank, being cylindrical and closed on top hermetically. Into the center of the top of this tank is tapped a pipe, B, and through opposite sides of the top are projected two pipes, C and D, and the three pipes B, C, and D communicate with a horizontal pipe, E—the pipe C through a valve, F, and the pipe D through a valve, G, adapted to shut off such communication; and between pipes B and C is interposed a valve, H, and between pipes B and D a valve, I. The pipe C forms an elbow inside of tank A, to connect with a chamber, J, perforated for connecting therewith a series of pipes, K, curved at their upper ends, and then passed down vertically with their lower ends inserted into cups L, secured upon the bottom of tank A, and provided with small lugs *l*, for supporting the pipe ends, which also may be provided with strainers to keep sand or gravel from filling the same. Another pipe, M, leads vertically downward, connecting with a chamber, N, also perforated for connecting a series of radial pipes, O, extending into cups L′, similarly constructed as cups L and secured against the side wall of the tank. A bottom nozzle of chamber N is connected with a T-coupling, *m*, again connecting with pipe D, and also with an inverted cup, P, secured upon the center of the bottom of tank A, and being perforated. The pipe D has a branch, Q, provided with a valve, R, and the pipe E, by a pipe, S, connecting with the discharge-valve chamber of a steam-pump, T.

U is the suction-pipe of the pump.

The tank A being filled with gravel and sand, the operation of the apparatus is as follows, to wit: The valves F, I, and G being closed and the valves H and R being opened, the pump T will force the water drawn from the river, lake, or well through pipes S and B into the top of the tank, thence through the sand and gravel therein, where all impurities will be retained, and thence through the perforations into chamber F, and through pipes D and Q into the reservoirs, whence the pure water is drawn or distributed for the different purposes desired. From time to time this tank requiring to be washed out, which is done by reversing the flow of the water through the tank and through the gravel and sand therein, I accomplish this by shutting valves H, G, and R and by opening valves F and I, when the water will be forced through pipes S and C into chamber J, whence it will be distributed through pipes K and O, to squirt out from cups L and L′, so as to be distributed to rise through the gravel and sand uniformly, while a portion of the water is caused to enter the cup F through coupling *m*, squirting out through the perforations of said cup, all the water thus supplied taking an upward course through the sand and gravel, washing with it the collected impurities, and then passing off through pipes B and E into the sewer or other conduit. With this washing out a small amount of impurities forced in with the water will collect in the bottom of the tank; so, after the washing out has been completed, the valves F, I, and R are closed and the valves H and G are opened for discharging into the sewer the first water filtered again until the said water shows to be clear, when valve G is closed and valve R is opened.

In Figs. 4 and 5 my apparatus is shown in a modified form, or as applied to an open rectangular tank, and in this A denotes the tank with overflow-pipe N, and with pipes B and C placed on top and both connected with discharge-pipe S of pump T, the pipe C being provided with valve I and the pipe B with valve H. Pipe B has connected a series of rose-heads, W, through which the water is distributed over the entire surface of the tank, and the pipe C has connected a series of small vertical pipes, K, leading into cups L, secured upon the bottom of the tank. A perforated pipe, D, is placed in near the bottom of the tank, connecting at one end with pipe S, to communicate therewith through valve F, while the opposite end of pipe D connects with pipe Q, leading into the pure-water reservoir and communicating therewith through valve R. A branch pipe, E, of pipe D is provided with a valve, G, and both pipes V and E lead into the sewer or other conduit. The valves I, F, and G being closed and the valves H and R being opened, the water forced by the pump will pass through pipes S and B and will be discharged through rose-heads W upon the sand and gravel, filtering through the same, and then collecting in perforated pipe D, to be discharged into the pure-water reservoir through pipe Q.

For washing out the tank, the valves H, F, R, and G are closed and the valve I is opened, when the water will be forced through pipes S, C, and K, will squirt out from cups L, will thence rise through the gravel and sand, washing with it the impurities collected therein, and will thence be discharged into the sewer through pipe V. After thus being washed out, the valves I, F, and R are closed and the valves H and G are opened for discharging into the sewer the first water filtering through, and carrying with it impurities collected in the bottom of the tank during the washing out until such water shows to be clear.

The pipe D may be washed out thoroughly from time to time by closing valves H, I, and R and by opening valves F and G, for forcing the full stream of water through such pipe.

What I claim is—

In an apparatus for the purpose described, the combination, with the tank, the supply and discharge pipe, of a system of pipes, K, connected with the force-pump and extending through the filtering material into the bottom of the tank, and cups L, into which the ends of the pipe extend, secured to the bottom of the tank, and provided with lugs for supporting such pipe ends above the bottom of the cups, providing an annular opening for the water to squirt out, substantially as and for the purpose set forth.

In testimony whereof I affix my signature in presence of two witnesses.

OMAR H. JEWELL.

Witnesses:
WILLIAM H. LOTZ,
OTTO LUBKERT.